March 6, 1928.　　　　　　　　　　　　　　　　1,661,852
E. H. REMDE
INDUSTRIAL TRUCK
Filed March 17, 1927　　　　3 Sheets-Sheet 1
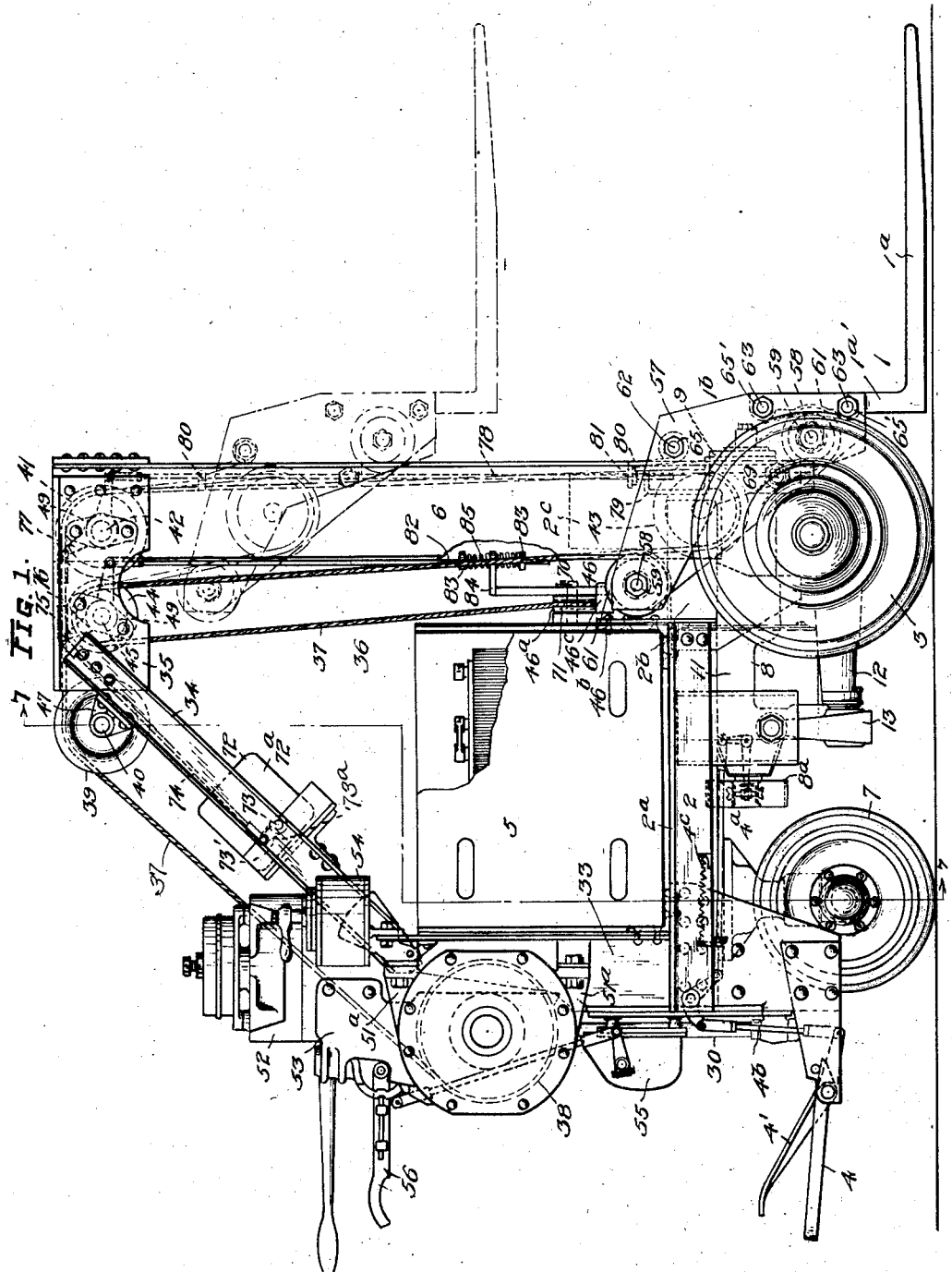
Inventor.
Edward H. Remde
By Geo A Pitts
Attorney March 6, 1928.  
E. H. REMDE  
INDUSTRIAL TRUCK  
Filed March 17, 1927
1,661,852
3 Sheets-Sheet 2
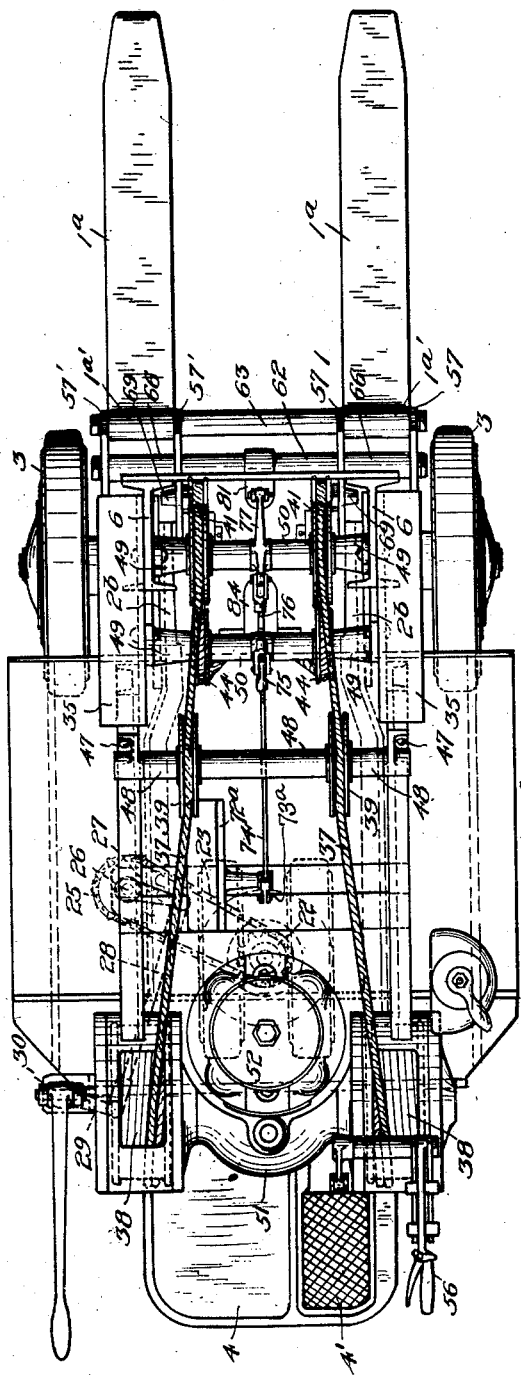
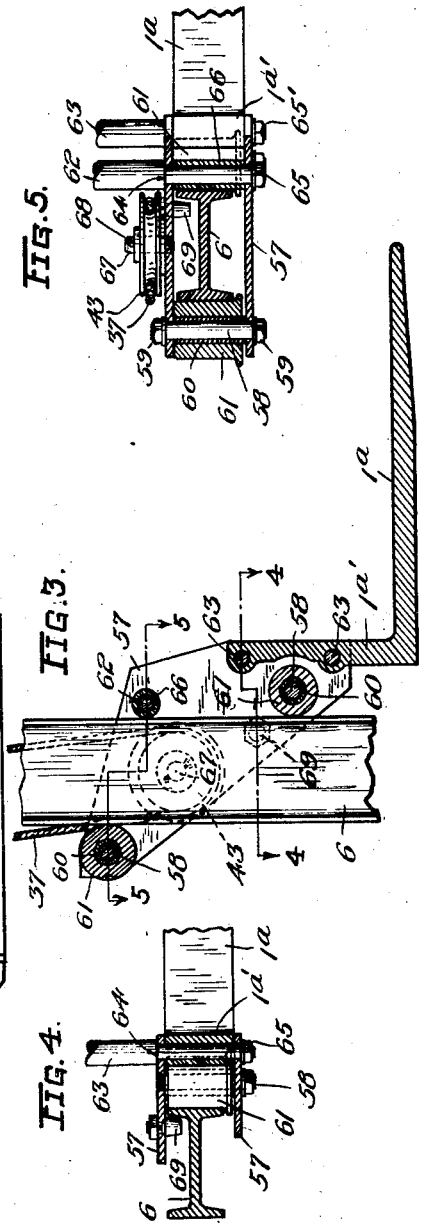
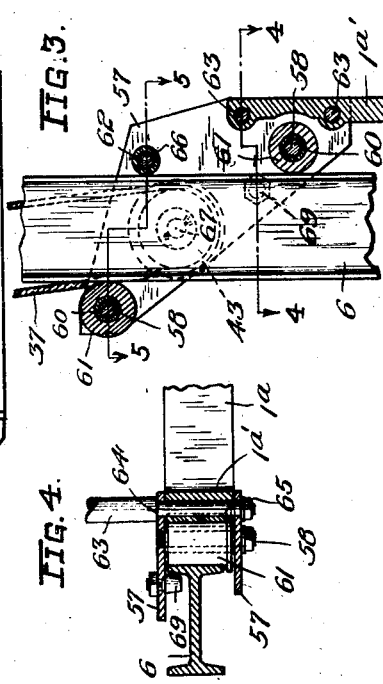

March 6, 1928.
E. H. REMDE
1,661,852
INDUSTRIAL TRUCK
Filed March 17, 1927
3 Sheets-Sheet 3
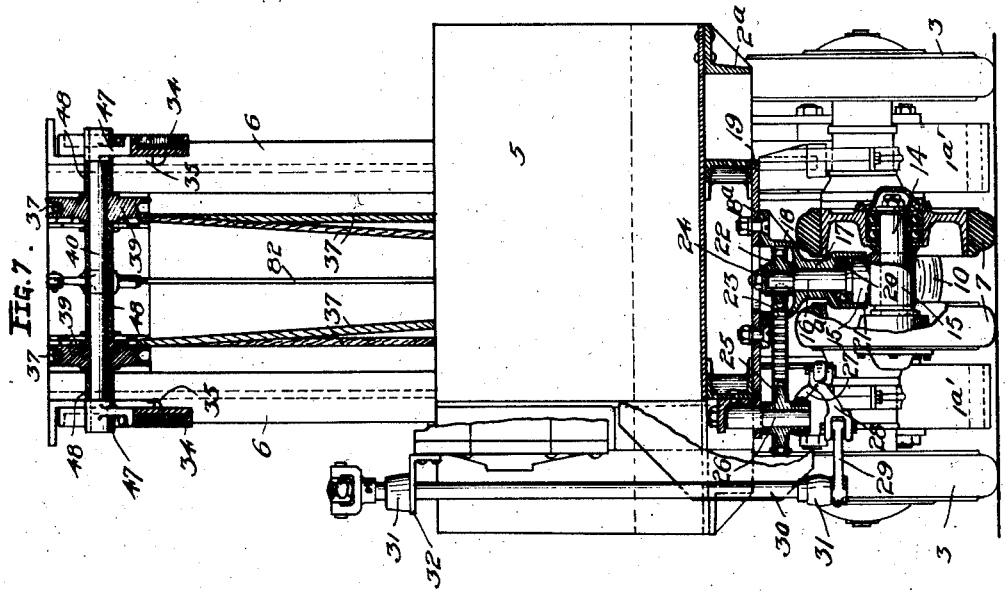
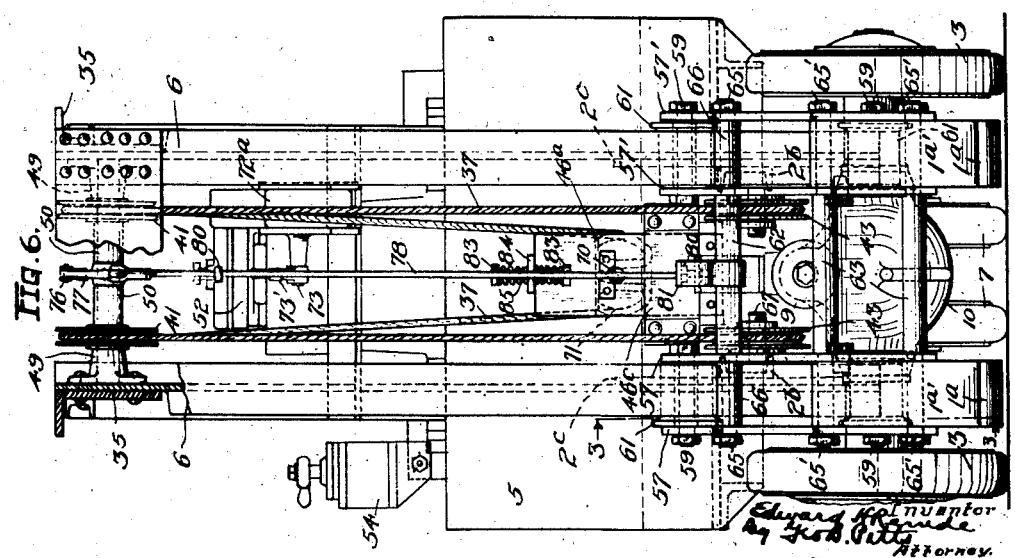

Patented Mar. 6, 1928.

1,661,852

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Application filed March 17, 1927. Serial No. 176,255.

This invention relates to an industrial truck of the type having an elevating load engaging and carrying member.

One object of the invention is to provide an improved truck construction in which the elements of the raising and lowering mechanism are arranged to permit of substantially full vision, by the operative, of the load and the loading and unloading operations thereof, whereby the movement of the truck when its load engaging and carrying member is engaging or discharging a load is facilitated and more effectively controlled.

Another object of the invention is to provide an improved elevating type of truck in which the elements for supporting the load engaging and carrying member on its guides are simplified to reduce cost of manufacture and assembly.

Another object of the invention is to provide an improved truck of the elevating type which is relatively simple to reduce its cost and weight and its units and parts are arranged to effect reduction in the over-all length of the truck to facilitate its movement from place to place.

Another object of the invention is to provide a truck of this character in which the truck frame and guide frame thereon are arranged to mount the latter substantially in line with the axis of the traction wheels for the truck, whereby tendency of tilting is reduced and the weight of the load insures maximum tractive effort between the traction wheels and road surface.

Other objects of the invention will be apparent to those skilled in the art to which my invention relates from the following description taken in connection with the accompanying drawings, wherein Fig. 1 is a side elevation of a truck embodying my invention.

Fig. 2 is a plan view.

Fig. 3 is a section on the line 3—3 of Fig. 6.

Fig. 4 is a section on the line 4—4 of Fig. 3.

Fig. 5 is a section on the line 5—5 of Fig. 3.

Fig. 6 is an end elevation looking toward the left of Fig. 1.

Fig. 7 is a section on the line 7—7 of Fig. 1.

In the form of construction shown herein by way of example, the load engaging and carrying member, indicated as an entirety at 1, is arranged to project beyond the end of the truck frame (indicated as an entirety at 2) and the adjacent pair of wheel 3 for the frame, and the operative stands on a platform 4 at the opposite end of the frame 2, as is generally the custom in trucks of this type, but it will be understood that the load engaging and carrying member may be otherwise arranged and the operative's station may be variously positioned.

The frame 2 comprises a main section 2ª, which supports the power supply means 5, and an outwardly extended section 2ᵇ having brackets 2ᶜ, which are suitably secured, as by welding or riveting, to the webs or walls of a pair of vertical guides 6, to support the latter. One end of the frame 2 is supported by the wheels 3 (already referred to); the opposite end of the frame may be supported by one or a pair of wheels 7. The power supply means 5, in the illustrated form of construction, comprise suitable storage batteries. In the preferred form of construction, the wheels 3 are traction wheels, being driven by a motor 8 (preferably an electric motor) through a propeller shaft within a casing 9 and a power transmitting mechanism (driven by the propeller shaft) within a housing 10 (see Figs. 6 and 7) and the wheels 7 are mounted for steering purposes. The motor 8 is rigidly supported in a cradle 11, preferably formed integral with the housing 10 and a tail member 12. The housing 10 and tail member 12 are connected with the frame 2 by a suspension mechanism, one element thereof being shown at 13. No claim is made herein to the suspension mechanism since the same forms the subject-matter of an application Ser. No. 420,630 filed jointly by John H. Hertner and myself (see Letters Patent No. 1,628,145.)

As already set forth, either one or a pair of wheels 7 may be mounted at the steering end of the frame, and these wheels 7 may be mounted on suitable knuckles; preferably I provide two wheels 7, suitably mounted on an axle 14, which swings about a vertical axis to effect steering. This arrangement permits the wheels to be positioned relatively close together, below the frame 2, and allows turning of the truck in a relatively small area. The central portion of the axle 14 is enlarged, as shown at 15, and this enlargement is provided with an upwardly extending boss 15ª, which carries a vertical spindle 16. The spindle 16 is rotatably mounted in a bearing 17. The bearing 17 depends downwardly from a substantially cup-shaped casing 18 having flanges 18ª, secured (as by countersunk bolts) to a plate 19. The plate 19 is secured in any suitable manner to the inner channels forming parts of the frame section 2ª. As shown in Fig. 7, the boss 15ª forms a seat for a thrust bearing 20 (preferably of the anti-friction type) disposed between it and the lower end of the bearing 17. The wall of the bearing 17 is provided with a tubular extension 21 which encloses the bearing 20. The upper end of the spindle 16 has keyed to it an operating element 22. Any form of operating means for operating the element 22 may be provided, but in the form illustrated herein it consists of construction of a sprocket 22, engaged by a chain 23. The hub of the sprocket 22 is engaged by a nut 24, threaded on the free end of the spindle 16. The opposite face of the sprocket hub bears on the upper end wall of the bearing 17, so that the nut 24 serves to hold the spindle in operative relation to the bearing 17 with the thrust bearing 20 between the boss 15ª and lower end wall of the bearing 17. The chain 23 also engages a sprocket 25 fixed to a stud shaft 26 mounted in any suitable manner on the frame 2. The shaft 26 or the hub of the sprocket 25 carries an arm 27, which is connected by a link 28 to an arm 29 on the lower end of a steering column 30. The column 30 is rotatably mounted in bearings 31, provided on suitable brackets 32.

33 indicates a pair of uprights mounted on the frame section 2ª adjacent the operative's station and connected in a suitable manner at their upper ends to the lower or inner ends of tie bars 34. The upper or outer ends of the bars 34 are connected to supporting members 35, which in turn are rigidly connected to the guides 6, the uprights 33, bars 34 and members 35 serving to brace the upper ends of said guides 6.

4ª indicates as an entirety a brake mechanism having elements arranged to engage a wheel 8ª driven by the motor 8, preferably fixed to an extended end of its shaft. The brake mechanism 4ª includes operating connections 4ᵇ connected to and operated to release the braking elements by a foot pedal 4' associated with the platform 4. The connections 4ᵇ are normally acted on in the opposite direction by a spring 4ᶜ to apply the elements to the wheel 8ª.

36 indicates as an entirety a raising and lowering mechanism for the load engaging and carrying member 1. The mechanism 36 preferably comprises one or more flexible members, such as cables 37, each connected at one end to a winding drum 38 on which it winds to raise the member 1 and from which it unwinds to lower the member 1. The cables 37 are operatively connected at their opposite ends to the member 1, in the following manner: from the drums 38, the cables 37 extend to and over a pair of guide sheaves 39 loosely mounted on a shaft 40; from the sheaves 39 the cables 37 extend to and around sheaves 41 loosely mounted on a shaft 42; from the sheaves 41 the cables 37 extend to and around sheaves 43, loosely mounted on the load engaging and carrying member 1, as will later appear; from the sheaves 43 the cables 37 extend to and around sheaves 44, loosely mounted on a shaft 45, and from the latter sheaves the cables extend to and are connected to an anchorage, indicated as an entirety at 46, which will be later described. The shaft 40 is supported at its ends in suitable standards 47 on the bars 34 and is provided with sleeves 48 (see Figs. 2 and 7) which space the sheaves 40 from each other and the standards 47. The shafts 42 and 45 are respectively supported at their ends in hollow bosses 49 having suitable flanges which are secured to the supporting members 35 and guides 6, respectively. Each shaft is provided with sleeves 50 which serve to space the adjacent sheaves apart and in engagement with the free ends of the supporting bosses.

The drums 38 are connected to a shaft or shaft sections driven by a suitable power mechanism mounted in a housing 51 and this mechanism is operated in either direction by a motor 52. The motor 52 is preferably of the electric type and receives its power from the supply means 5. The motor 52 is connected to a cradle 53 which may be formed integral with the walls of the housing 51. The motor 52 is controlled by a controller 54 and its shaft may be braked and released by a suitable mechanism actuated by a solenoid (not shown) connected in series with the motor circuit. The housing 51 is provided with feet 51ª by means of which it is rigidly supported on the uprights 33.

55 indicates the controller for the motor 8. 56 indicates a suitable handle connected with the controller for operating it.

The load engaging and carrying member 1 comprises one or more elements 1ª arranged to be projected below a load to lift it and a shoe 1ᵇ. The shoe 1ᵇ comprises pairs of plates 57—57, 57'—57', the plates of each pair being disposed upon opposite sides of and relatively close to one of the guides 6. The plates of each pair are held together by rods 58 extending through aligned openings therein and carrying nuts 59 on their outer ends engaging the outer faces of the plates and are held in spaced relation by sleeves 60 between the plates. The rods serve as shafts and the sleeves as bushings for guide rollers 61 (preferably flanged) engaging walls of the adjacent guide 6. In the preferred construction and arrangement, each guide is formed from an I-beam and the rollers 61 engage the opposite outer faces of the flanges thereof. As shown, the inner rollers 61 are above the outer rollers 61 so that through their engagement with the guides the lifting elements 1ª will be supported in an operating position.

The plates 57—57, 57'—57', are rigidly connected together and in spaced relation by a rod 62, preferably arranged near or extending between their upper portions. The rod 62 is reduced at its ends to form shoulders 64 which engage the opposed faces of the inner plates and the reduced ends extend through aligned openings formed in the plates and carry nuts 65 on their free ends to engage the outer plates. Between each pair of plates the rod 62 carries a sleeve 66 which serves to maintain the plates in spaced relation. The lift elements 1ª are provided with up-standing arms 1ª', each of which is disposed between the plates constituting one pair thereof. The arms 1ª' are formed with one or more transverse openings (preferably two) which register with aligned openings formed in the adjacent plates to receive rods 63. These rods may be similar in construction to the rod 62 and provided with nuts 65' which when tightened, secure the arms 1ª' between the plates. The rods 63 are removable, so that the lift elements may be dis-assembled and other types of lift elements substituted.

It will be noted that the rod 62, and sleeve 66 and nuts 65 thereon and the rods 63 and arms 1ª' and nuts 65' thereon cooperate with the rods 58, sleeves 60 and nuts 59 to support each pair of the plates in rigid relation.

67 indicates stud shafts each extending inwardly from the inner plate of all and loosely supporting on its inner face one of the sheaves 43 (see Fig. 5), the sheave being held on its shaft by a cotter pin 68 or other suitable device.

From the foregoing description it will be seen that the space between the guides 6 or the plates 57—57, 57'—57', is substantially open so that the operative has an unobstructed view at all times of the load and load engaging and carrying member 1, which is particularly advantageous at and during the time that he is manipulating the truck or the load engaging and carrying member, or both, to engage or discharge a load.

69 indicates pins projecting inwardly from the inner faces of one plate of each pair (preferably the inner plate) and disposed behind the outer flange of the guide. The pin 69 extends through an opening formed in the plate and is connected thereto by a nut threaded on its inner end. The outer end of the pin 69 does not engage the flange guide during the raising and lowering of the load engaging and carrying member 1, but is arranged to engage the flange to maintain the shoe in operative relation to the guides 6 in the event the member 1 meets with an obstruction when moving downwardly.

The anchorage 46 is constructed to take up slack in the cables 37, particularly in the event the load engaging and carrying member 1 meets with an obstruction when moving downwardly. The anchorage comprises a base 46ª guided between an up-standing plate 46ᵇ mounted on the frame 2ª and a yoke 46ᶜ having flanges secured to the plate. The base 46ª comprises spaced members which support the opposite ends of a shaft 70. 71 indicates an equalizing member mounted to rotate or rock on the shaft 70 as shown in Fig. 6, the outer ends of the cables 37 being connected to the member 71. The base 46ª is provided with laterally extending wings which are held against the lower edge of the yoke 46ᶜ by reason of the pull or tension on the cables 37; but when slack occurs in the cables, the base, due to its weight gravitates downwardly and thus takes up any and all slack in the cables.

72 indicates as an entirety a limiting means operatively connected with the load engaging and carrying member 1 and with the anchorage 46. Of these means, 72ª indicates a casing preferably carried by one of the bars 34 and enclosing switches through either of which the circuit to the motor 52 is made. The movable elements of the switches are operated by a device carried by a rock shaft 73. The shaft 73 has an arm 73ª connected by a link 74 to one arm of a bell crank 75 loosely mounted on the shaft 45 between the sleeves 50 thereon and this arm is connected by a link 76 with the corresponding arm of a bell crank 77, loosely mounted on the shaft 42 between the sleeves 50 thereon. The other arm of the bell crank 77 has connected to it a rod 78 extending downwardly in a direction substantially parallel to the guides 6, being slidably supported in an opening formed in a plate 79 carried on the outer end of the frame section 2ᵇ. The rod 78 carries near its upper and lower ends adjustable tappets 80, and either of these tappets is arranged to be engaged by a striker 81 on the shoe 1ᵇ, when the latter moves in one direction or another to its limit of movement as determined by the adjustment of the tappet, and through such tappet and the rod 78 to operate one of the switches in the casing 72ª. The striker 81 may comprise the free end of a plate having a portion rolled around the rod 62, the free end of the plate preferably being bifurcated so as to straddle the rod 78. The other arm of the bell crank 75 has connected to it a depending rod 82 which carries a pair of adjustable collars 83 and the base 46ª has an arm 84 which is bifurcated to straddle the rod 82 or formed with an opening through which the rod extends. The arm 84 is disposed between the collars 83 and between it and each collar is a coiled spring 85 normally tending to hold the rod and parts connected to it in normal position. This construction performs two functions, to wit, (1) to operate the limiting means 72 when the slack take-up devices operate and to restore the limiting means to normal position when operated by either the slack take-up devices or the shoe 1ᵇ. When the base 46ª moves downwardly, it carries with it the arm 84 and this arm acting through the lower spring 85 and lower collar 83 moves the rod 82 downwardly, and accordingly operates one of the switches in the casing 72ª. When the rod 78 is operated in either direction in the manner above set forth the rod 82 will be moved in the same direction and this operation will serve to compress the spring between one of the collars 83 and the arm 84, so that upon the reverse movement of the shoe 1ᵇ, the spring 85, which has been compressed, will restore the limiting means and connected parts to their normal position.

No claim is made herein to the slack take up means and its connection with the limiting means since the same is the invention of A. G. Hutzley and forms the subject-matter of a co-pending application.

To those skilled in the art to which my invention relates many changes in construction and widely differing embodiments and applications of the invention will suggest themselves without departing from the spirit and scope thereof. The descriptions and the disclosure herein are purely illustrative and are not intended to be in any sense limiting.

What I claim is:

1. In apparatus of the class described, the combination of a frame having substantially vertical spaced guides thereon, wheels for supporting said frame, a load engaging and carrying member having a shoe slidably engaging said guides, said shoe comprising pairs of plates, the plates of each pair being disposed upon the opposite sides and in close relation to one of said guides, means for maintaining each pair of plates in fixed, spaced relation, rollers between each pair of plates in engagement with the guides, means for maintaining the pairs of plates in spaced relation, and means for raising and lowering said load engaging and carrying member.

2. In apparatus of the class described, the combination of a frame having substantially vertical spaced guides thereon, wheels for supporting said frame, a load engaging and carrying member having a shoe slidably engaging said guides, said shoe comprising pairs of plates, the plates of each pair being disposed upon the opposite sides and in close relation to one of said guides, means for maintaining each pair of plates in fixed, spaced relation, rollers between each pair of plates in engagement with the guides, means for maintaining the pairs of plates in spaced relation, and means for raising and lowering said load engaging and carrying member, said raising and lowering means including flexible members and reeving elements on said guides and shoe and the reeving element on said shoe being supported on the inner face of one of the inner plates.

3. In apparatus of the class described, the combination of a frame having substantially vertical spaced guides thereon, wheels for supporting said frame, a load engaging and carrying member having a shoe slidably engaging said guides, said shoe comprising pairs of plates, the plates of each pair being disposed upon the opposite sides and in close relation to one of said guides, means for maintaining each pair of plates in fixed, spaced relation, rollers between each pair of plates in engagement with the guides, means for maintaining the pairs of plates in spaced relation, comprising a cross rod connected to the plates, and means for raising and lowering said load engaging and carrying member.

4. In apparatus of the class described, the combination of a frame, spaced guides mounted substantially vertically thereon, wheels for supporting said frame, a load engaging and carrying member having a shoe and a lifting element, said shoe, comprising portions connected in fixed spaced relation and each movably engaging front and rear surfaces of one of the guides and said lifting element having a pair of spaced up-standing arms each disposed in the plane of the adjacent guide and connected to the shoe portion that engages therewith, whereby to permit unobstructive view therethrough, and means for raising and lowering said member.

5. In apparatus of the class described, the combination of a frame, spaced guides mounted substantially vertically thereon, wheels for supporting said frame, a load engaging and carrying member having a shoe, comprising portions disposed in spaced relation to permit unobstructed view between and through the guides and each portion having an upper roller and a lower roller movably engaging the adjacent guide, means disposed below the lower roller for connecting the shoe portions together, and means for raising and lowering said member.

6. In apparatus of the class described, the combination of a frame, spaced guides mounted substantially vertically thereon, wheels for supporting said frame, a load engaging and carrying member having a shoe and a pair of lift elements having up-standing arms, said shoe comprising pairs of plates, the plates of each pair being disposed upon and in close relation to the opposite sides of one of said guides, rollers between each pair of plates in engagement with the adjacent guide, the up-standing arm of each lift element being mounted between the adjacent pair of plates, means for securing each pair of plates in fixed, spaced relation with the adjacent arm between them, and means for raising and lowering said member.

7. In apparatus of the class described, the combination of a frame having substantially vertical guides, wheels for supporting said frame, a load engaging and carrying member having a shoe, said shoe comprising pairs of plates, the plates of each pair being disposed upon opposite sides of one of said guides, means for connecting each pair of plates together in fixed, spaced relation, said means comprising a pair of rods and rollers on said rods engaging the adjacent guide, and means for raising and lowering said member.

8. In apparatus of the class described, the combination of a frame, a pair of guides mounted thereon, wheels for supporting said frame, a load engaging and carrying member having a shoe, said shoe comprising portions each engaging one of said guides and spaced from each other to form an unobstructed space between them, a pair of flexible members, reeving elements for said flexible members on the upper portions of the guides, a reeving element for one of said flexible members on the adjacent shoe portion, and means for winding or unwinding said flexible members.

9. In apparatus of the class described, the combination of a frame having substantially vertical spaced guides thereon, wheels for supporting said frame, a load engaging and carrying member having a shoe slidably engaging said guides, said shoe comprising pairs of plates, the plates of each pair being disposed upon the opposite sides and in close relation to one of said guides, means for maintaining each pair of plates in fixed, spaced relation, rollers between each pair of plates in engagement with the guides, means for maintaining the pairs of plates in spaced relation, comprising a cross rod connected to the upper portion of the plates and a cross rod connected to the lower portion thereof, and means for raising and lowering said load engaging and carrying member.

In testimony whereof, I have hereunto subscribed my name.

EDWARD H. REMDE.